(12) United States Patent
Obata (10) Patent No.: US 11,951,780 B2
(45) Date of Patent: Apr. 9, 2024

(54) TRANSMITTER, TRIGGER DEVICE, ID CODE REGISTRATION SYSTEM, AND ID CODE REGISTRATION METHOD

(71) Applicant: PACIFIC INDUSTRIAL CO., LTD., Ogaki (JP)

(72) Inventor: Takahito Obata, Hashima (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 895 days.

(21) Appl. No.: 16/306,637

(22) PCT Filed: Dec. 1, 2017

(86) PCT No.: PCT/JP2017/043276
§ 371 (c)(1),
(2) Date: Apr. 30, 2021

(87) PCT Pub. No.: WO2019/106827
PCT Pub. Date: Jun. 6, 2019

(65) Prior Publication Data
US 2022/0266638 A1 Aug. 25, 2022

(51) Int. Cl.
*B60C 23/04* (2006.01)
(52) U.S. Cl.
CPC ...... *B60C 23/0472* (2013.01); *B60C 23/0461* (2013.01); *B60C 23/0462* (2013.01); *B60C 23/0479* (2013.01)
(58) Field of Classification Search
CPC ............ B60C 23/0472; B60C 23/0461; B60C 23/0462; B60C 23/0479
See application file for complete search history.

(56) References Cited

U.S. PATENT DOCUMENTS

2014/0165026 A1 6/2014 McIntyre et al.
2018/0194176 A1* 7/2018 Bout .................... G07C 5/0816

FOREIGN PATENT DOCUMENTS

CN 104995044 A 10/2015
JP 5107134 A 4/1993
(Continued)

OTHER PUBLICATIONS

Second Office Action dated May 8, 2021 for Chinese Application No. 201780036053.0, 20 pages.
(Continued)

*Primary Examiner* — Curtis B Odom
(74) *Attorney, Agent, or Firm* — CANTOR COLBURN LLP (57) ABSTRACT

A transmitter is coupled to each of a plurality of wheel assemblies included in a vehicle. The transmitter is configured to function in one of a plurality of formats that are selectable by a command from a trigger device. The transmitter includes a pressure sensor configured to detect the tire pressure, a memory that stores an ID code, a transmission unit configured to transmit a signal, a controller configured to control the transmitter, and a trigger reception unit configured to receive a trigger signal including the command from the trigger device. The controller is configured so that when the trigger reception unit receives a trigger signal including a command designating a format of the transmitter, the controller has the transmitter function in the designated format and has the transmission unit transmit the signal including the ID code to register the ID code to an in-vehicle receiver.

5 Claims, 3 Drawing Sheets

(56) References Cited

FOREIGN PATENT DOCUMENTS

| JP | 200617463 A | 1/2006 |
| JP | 2006175972 A | 7/2006 |
| JP | 201491344 A | 5/2014 |
| JP | 201694036 A | 5/2016 |

OTHER PUBLICATIONS

International Search Report for PCT/JP2017/043276 filed Dec. 1, 2017 (3 pages).

* cited by examiner

TRANSMITTER, TRIGGER DEVICE, ID CODE REGISTRATION SYSTEM, AND ID CODE REGISTRATION METHOD

TECHNICAL FIELD

The present invention relates to a transmitter, a trigger device, an ID code registration system, and an ID code registration method.

BACKGROUND ART

Patent document 1, for example, describes a tire condition monitoring apparatus arranged in a vehicle, which includes a plurality of wheel assemblies. The tire condition monitoring apparatus described in patent document 1 includes a transmitter, which is mounted on each wheel assembly, and an in-vehicle receiver, which is installed in the vehicle body.

The transmitter includes a pressure sensor that detects the tire pressure, a transmission unit, and a controller that controls the transmitter. The transmission unit transmits a data signal including a detection result of the pressure sensor. For example, the transmission unit transmits the data signal at predetermined intervals. The data signal also includes an ID code. The ID code is information used to identify the transmitter and set for each transmitter. The protocol differs depending on the vehicle model (in-vehicle receiver). Accordingly, the format of transmitter mounted on the wheel assembly is selected in correspondence with the vehicle model.

Further, the transmitter includes a trigger reception unit configured to receive a trigger signal transmitted from a trigger device. The trigger signal is transmitted from the trigger device when externally issuing a command to the transmitter. The trigger signal is transmitted, for example, at any given time when there is a need for a data signal to be transmitted or the mode of the transmitter to be changed. The trigger reception unit receives the trigger signal, and the controller executes control in accordance with the command.

The ID code of the transmitter is registered to the in-vehicle receiver. Accordingly, the in-vehicle receiver is associated with the transmitter mounted in the vehicle (own vehicle) in which the in-vehicle receiver is installed. The in-vehicle receiver receives the data signal from the transmission unit and verifies the ID code included in the data signal with the ID code registered to the in-vehicle receiver. As a result of the verification, when the two ID codes match, the in-vehicle receiver employs the data of the received data signal. The tire condition monitoring apparatus is configured to receive the data signal transmitted from the transmitter in order to monitor the tire condition.

PRIOR ART LITERATURE

Patent Literature

Patent Document 1: Japanese Laid-Open Patent Publication No. 2014-91344

SUMMARY OF THE INVENTION

Problem to be Solved by the Invention

There is a transmitter configured to function in one of a plurality of selectable formats. In such type of a transmitter, the trigger device is used to select the format. The trigger device is also used to register an ID code to the in-vehicle receiver. Thus, the trigger device needs to perform both format selection and ID code registration, in the transmitter, which is configured to function in one of a plurality of selectable formats. This is burdensome.

One object of the present invention is to provide a transmitter, a trigger device, an ID code registration system, and an ID code registration method that facilitate registration of an ID code to an in-vehicle receiver.

Means for Solving the Problem

In accordance with a first embodiment, the present invention that achieves the above object provides a transmitter that is coupled to each of a plurality of wheel assemblies included in a vehicle and configured to function in one of a plurality of formats that are selectable by a command from a trigger device. The transmitter includes a pressure sensor configured to detect a pressure of a tire, a memory that stores an ID code, a transmission unit configured to transmit a signal, a controller configured to control the transmitter, and a trigger reception unit configured to receive a trigger signal including the command from the trigger device. The controller is configured so that when the trigger reception unit receives a trigger signal including a command designating a format of the transmitter, the controller has the transmitter function in the designated format and has the transmission unit transmit the signal including the ID code to register the ID code to an in-vehicle receiver.

Accordingly, when the trigger reception unit receives the trigger signal including the command designating the format of the transmitter, the controller has the transmitter function in the designated format. Further, the controller has the transmitter transmit the signal including the ID code. The signal is transmitted for registering the ID code to the in-vehicle receiver. In this manner, an operator operates the trigger device to designate the format of the transmitter and have the transmitter transmit the signal for registering the ID code. Thus, compared to when separately instructing the designation of the format and the transmission of the signal for registration of the ID code with the trigger device, the ID code is registered more easily.

In the transmitter, the controller may be configured to transmit the signal including the ID code from the transmission unit in accordance with both a protocol that corresponds to the trigger device and a protocol that corresponds to the designated format.

A process that registers the ID code to the in-vehicle receiver includes a process that transmits the ID code to the in-vehicle receiver from the trigger device by connecting the trigger device to the in-vehicle receiver and a process that has the in-vehicle receiver receive the signal transmitted from the transmitter. When using the process that connects the trigger device to the in-vehicle receiver, the trigger device needs to receive the signal including the ID code. When using the process that has the in-vehicle receiver receive the signal transmitted from the transmitter, the in-vehicle receiver needs to receive the signal transmitted from the transmitter. In this respect, the transmission of the signal including the ID code in accordance with both the protocol corresponding to the trigger device and the protocol corresponding to the designated format enables both the trigger device and the in-vehicle receiver to receive the signal. Thus, regardless of the process, the ID code is registered to the in-vehicle receiver.

In accordance with a second embodiment, the present invention that achieves the above object provides a trigger device that is configured to transmit a trigger signal to a transmitter that is mounted on each of a plurality of wheel assemblies included in a vehicle and executes a process in accordance with a command included in the trigger signal. The transmitter is configured to function in one of a plurality of formats that are selectable by a command included in the trigger signal. The trigger device includes a reception unit configured to receive a signal transmitted from the transmitter, a trigger device memory, and a trigger device controller configured to control the trigger device. The trigger device controller is configured so that when the trigger device controller receives a signal transmitted from the transmitter with the reception unit in response to the trigger signal that includes a command designating the format, the trigger device controller stores an ID code included in the signal in the trigger device memory. The trigger device controller is further configured so that when the trigger device is connected to an in-vehicle receiver, the trigger device controller transmits the ID code stored in the trigger device memory to the in-vehicle receiver in order to register the ID code to the in-vehicle receiver.

After receiving the trigger signal including the command designating the format, the transmitter transmits the signal to the reception unit of the trigger device in response to the trigger signal. The signal includes the ID code. When the reception unit receives the signal, the trigger device controller stores the ID code included in the signal in the trigger device memory for registration to the in-vehicle receiver. When the trigger device is connected to the in-vehicle receiver, the trigger device controller transmits the ID code stored in the trigger device memory to the in-vehicle receiver. In this way, the transmission of the signal from the transmitter in response to the trigger signal including the command designating the format easily registers the ID codes to the in-vehicle receiver. This facilitates the registration of the ID code.

In accordance with a third embodiment, the present invention that achieves the above object provides an ID code registration system that includes a transmitter that is coupled to each of a plurality of wheel assemblies included in a vehicle and configured to function in one of a plurality of formats that are selectable by a command included in a trigger signal, and a trigger device that transmits the trigger signal to the transmitter. The transmitter includes a pressure sensor configured to detect a pressure of a tire, a memory that stores an ID code, a transmission unit configured to transmit a signal, a controller configured to control the transmitter, and a trigger reception unit configured to receive the trigger signal. The controller is configured so that when the controller receives the trigger signal including a command designating a format of the transmitter with the trigger reception unit, the controller has the transmitter function in the designated format and has the transmission unit transmit a signal including the ID code to register the ID code to an in-vehicle receiver. The trigger device includes a reception unit configured to receive a signal transmitted from the transmitter, a trigger device memory, and a trigger device controller configured to control the trigger device. The trigger device controller is configured so that when the reception unit receives the signal including the ID code, the trigger device controller stores the ID code included in the signal in the trigger device memory. The trigger device controller is further configured so that when the trigger device is connected to the in-vehicle receiver, the trigger device controller transmits the ID code stored in the trigger device memory to the in-vehicle receiver in order to register the ID code to the in-vehicle receiver.

Accordingly, an operator operates the trigger device to designate the format of the transmitter and have the transmitter transmit the signal for registering the ID code. This facilitates the registration of the ID code.

In accordance with a fourth embodiment, the present invention that achieves the above object provides a method for registering an ID code of a transmitter that is coupled to each of a plurality of wheel assemblies included in a vehicle to an in-vehicle receiver with a trigger device. The method includes transmitting a trigger signal including a command designating a format to the transmitter from the trigger device, and registering the ID code to the in-vehicle receiver with a signal transmitted from the transmitter in response to reception of the trigger signal and including the ID code of the transmitter.

Accordingly, an operator operates the trigger device to designate the format of the transmitter and have the transmitter transmit the signal for registering the ID code. This facilitates the registration of the ID code.

Effect of the Invention

The present invention facilitates registration of the ID code.

EMBODIMENTS OF THE INVENTION

A transmitter, a trigger device, an ID code registration system, and an ID code registration method according to one embodiment will now be described.

Figure 1:
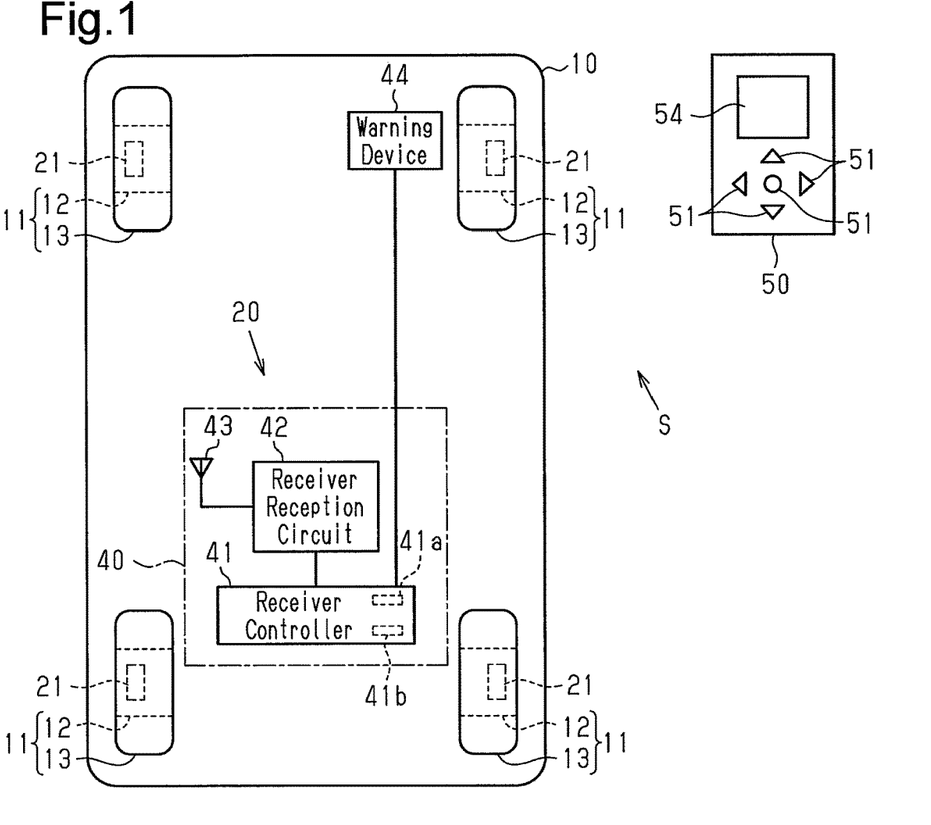
FIG. 1 is a schematic diagram of a tire condition monitoring apparatus and a trigger device.

As shown in FIG. 1, a tire condition monitoring apparatus 20 includes transmitters 21 that are respectively mounted on four wheel assemblies 11 of a vehicle 10 and an in-vehicle receiver 40 that is arranged in the body of the vehicle 10. Each wheel assembly 11 includes a wheel 12 and a tire 13, which is mounted on the wheel 12. The transmitter 21 may be a transmitter fixed to a tire valve or a transmitter fixed to the wheel 12 and the tire 13.

The transmitter 21 is coupled to the wheel assembly 11 so as to be located in the interior of the tire 13. The transmitter 21 detects the condition of the corresponding tire 13, for example, the air pressure of the tire 13 and the temperature inside the tire 13, and transmits a data signal including the detection results to the in-vehicle receiver 40. The tire condition monitoring apparatus 20 receives the data signal transmitted from the transmitter 21 and monitors the condition of the tire 13.

Figure 2:
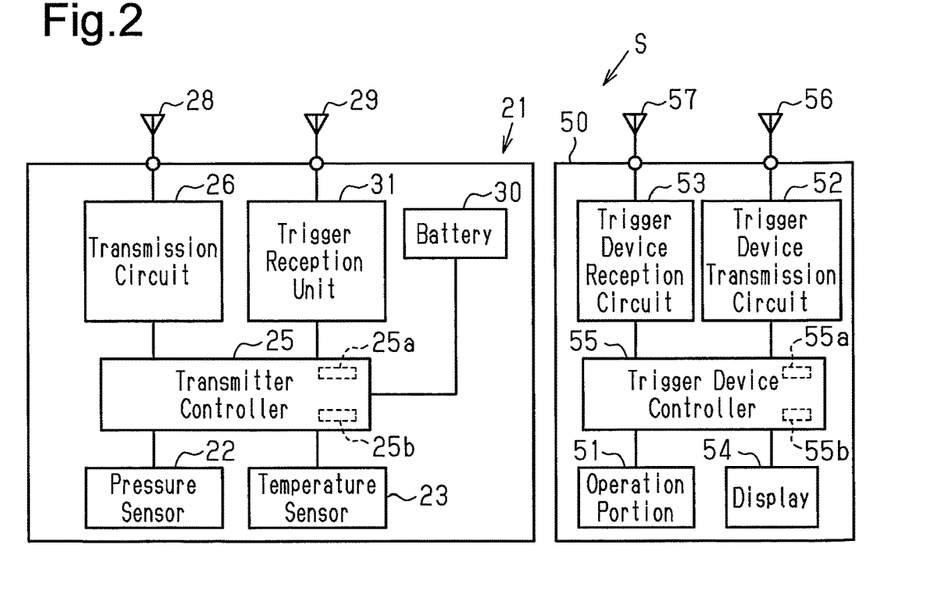
FIG. 2 is a schematic diagram showing a configuration of a transmitter and the trigger device.

As shown in FIG. 2, the transmitter 21 includes a pressure sensor 22, a temperature sensor 23, a transmitter controller 25, a transmission circuit 26, a transmission antenna 28, a reception antenna 29, a battery 30, and a trigger reception unit 31. The battery 30 is a power source of the transmitter 21.

The pressure sensor 22 detects the pressure (air pressure) of the corresponding tire 13. The pressure sensor 22 outputs the detection result to the transmitter controller 25. The temperature sensor 23 detects the temperature inside the corresponding tire 13. The temperature sensor 23 outputs the detection result to the transmitter controller 25.

The transmitter controller 25, which serves as a controller, is configured by a microcomputer or the like including a CPU 25a and a memory 25b (RAM, ROM, or the like). An ID code that is identification information unique to each transmitter 21 is registered to the memory 25b. Further, the memory 25b stores various programs to control the transmitter 21.

The transmitter controller 25 may include exclusive hardware (application specific integrated circuit: ASIC) to execute at least part of a process. More specifically, the transmitter controller 25 can be a circuit (circuitry) that includes 1) one or more processors that run on a computer program (software), 2) one or more exclusive hardware circuits such as an ASIC, or 3) a combination of the above. A processor includes a CPU and a memory such as a RAM or a ROM. The memory stores program codes or commands that are configured to have the CPU execute a process. The memory, which is a computer readable medium, may be any available medium that is accessible by a versatile or a dedicated computer.

The transmitter controller 25 generates and outputs data to the transmission circuit 26. The transmission circuit 26, which serves as a transmission unit, modulates the data received from the transmitter controller 25 to generate a signal (RF signal) and transmits the signal from the transmission antenna 28. For example, the transmitter controller 25 receives detection results from the pressure sensor 22 and the temperature sensor 23 to generate data that includes the tire condition (air pressure of tire, inner temperature of tire) and an ID code. The transmitter controller 25 then transmits a data signal including the data.

The trigger reception unit 31 receives a trigger signal transmitted from a trigger device 50. The trigger reception unit 31 includes a filter and an amplification circuit. The filter allows for passage of, among signals that have reached the reception antenna 29, only signals of a certain frequency band. The amplification circuit amplifies the signals.

The trigger signal is an LF band (long wave band) signal. The trigger device 50 is a device that transmits a trigger signal including a command, which is issued to the transmitter 21, and has the transmitter 21 execute various operations. The transmitter controller 25 executes processes in accordance with the command included in the trigger signal, which is received by the trigger reception unit 31.

The transmitter 21 is configured to function in one of a plurality of selectable formats. The memory 25b stores format information for the transmitter 21 to function in the plurality of formats. The format of the transmitter 21 is associated with the vehicle model. Each format corresponds to a plurality of vehicle models.

Figure 3:
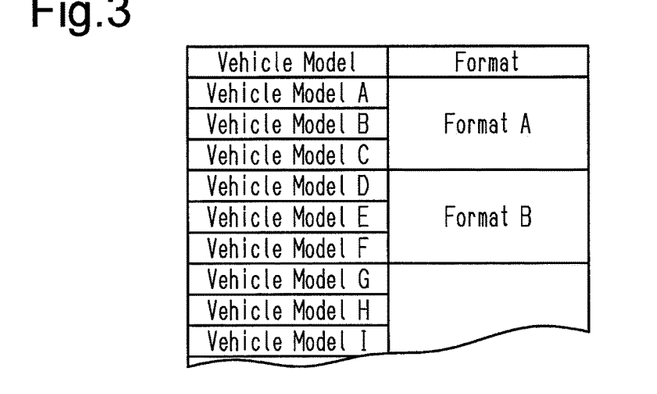
FIG. 3 is a schematic diagram showing the relationship between vehicle models and transmitter formats.

For example, as shown in FIG. 3, format A corresponds to vehicle models A, B, and C. Further, format B corresponds to vehicle models D, E, and F. The number of vehicle models that corresponds to one format differs between the formats. Even when the model names are the same, "vehicle models" are considered to be different if the model years are different.

The protocol of the in-vehicle receiver 40 differs depending on the vehicle model. Accordingly, a frame format specified by the protocol also differs depending on the vehicle model. Unless the data signal is in compliance with the protocol of the in-vehicle receiver 40, the in-vehicle receiver 40 cannot receive a data signal. Referring to the example shown in FIG. 3, the transmitter 21 that functions in format A allows the in-vehicle receiver 40 of vehicle models A, B, and C to receive data signals but does not allow the in-vehicle receiver 40 of other vehicle models to receive data signals. The format information is information of the specification that enables communication with the in-vehicle receiver 40. Further, depending on the formats, data signals are transmitted at different intervals and the resolution capability of pressure data and temperature data varies.

In the present embodiment, the memory 25b stores format information of the plurality of formats, and the transmitter 21 is configured to function in one of the plurality of selectable formats. The transmitter 21 functions in the selected format. Accordingly, the transmitter 21 corresponds to more vehicle models compared to a transmitter that functions only in one format.

The memory 25b stores programs for each format so that the transmitter 21 functions in one of the plurality of formats. The transmitter 21 runs on a program corresponding to the selected format. Alternatively, the memory 25b may store a single program as format information, and the processing procedures may be externally changed so that the transmitter 21 functions in the selected format. That is, the transmitter 21 may be controlled in any manner as long as the format is selected from the plurality of formats and the transmitter 21 functions in the selected format.

As shown in FIG. 1, the in-vehicle receiver 40 includes a receiver controller 41, a receiver reception circuit 42, and a reception antenna 43. The receiver controller 41 is connected to a warning device 44. The receiver controller 41 is configured by a microcomputer or the like including a CPU 41a and a receiver memory 41b (RAM, ROM, or the like).

The receiver reception circuit 42 receives a data signal from each transmitter 21 via the reception antenna 43. The receiver reception circuit 42 demodulates and outputs the data signal to the receiver controller 41.

The receiver memory 41b stores the ID code of the transmitter 21 mounted on each wheel assembly 11. This associates the transmitter 21 with the in-vehicle receiver 40. The receiver controller 41 verifies the ID code included in the data signal, which is received by the receiver reception circuit 42, with the ID code stored in the receiver memory 41b. As a result of the verification, when the ID code included in the data signal matches the ID code registered to the receiver memory 41b, the receiver controller 41 employs the data included in the data signal. The receiver controller 41 detects the condition of the tire 13 from the data included in the data signal transmitted from the transmitter 21, which is associated with the in-vehicle receiver 40. When there is an anomaly in the tire 13, the receiver controller 41 issues a notification with the warning device 44 (notification device). The warning device 44 may be a device that issues a notification of an anomaly by continuously illuminating or intermittently illuminating a light or a device that issues a notification of an anomaly by producing sound. Alternatively, the receiver controller 41 may show the condition of the tire 13 on a display that is visible to the occupant of the vehicle 10.

As described above, the transmitter 21 functions in one of the plurality of formats. The trigger device 50 is used to set the format. The trigger device 50 is also used to register the ID codes to the in-vehicle receiver 40. Each transmitter 21 and the trigger device 50 function as an ID code registration system S. The trigger device 50 will now be described in detail.

As shown in FIGS. 1 and 2, the trigger device 50 includes a plurality of operation portions 51, a trigger device transmission circuit 52, a trigger device reception circuit 53, a display 54, a trigger device controller 55, a trigger device transmission antenna 56, and a trigger device reception antenna 57. Each operation portion 51 is operated by an operator of the trigger device 50. The operation portions 51 include selection keys and an enter key. The selection keys select one of the selections (menu) displayed on the display 54. The enter key enters the selection. The operator operates the operation portions 51 so as to have the trigger device 50 perform various actions.

The operation portions 51 are connected to the trigger device controller 55. The trigger device controller 55 is configured by a microcomputer or the like including a CPU 55a and a trigger device memory 55b (RAM, ROM, or the like). The trigger device memory 55b stores commands (command=data string) that correspond to the actions that are to be performed by the transmitter 21. The commands stored in the trigger device memory 55b include a command that designates the format of the transmitter 21. The command, which designates the format of the transmitter 21, differs between the formats.

The trigger device controller 55 may include exclusive hardware (application specific integrated circuit: ASIC) to execute at least part of a process. More specifically, the trigger device controller 55 can be a circuit (circuitry) that includes 1) one or more processors running on a computer program (software), 2) one or more exclusive hardware circuits such as an ASIC, or 3) a combination of the above. A processor includes a CPU and a memory such as a RAM or a ROM. The memory stores program codes or commands that are configured to have the CPU execute a process. The memory, which is a computer readable medium, may be any available medium that is accessible by a versatile or dedicated computer.

The trigger device controller 55 generates data in accordance with the operation by the operation portions 51. The data includes the command determined by the operation portion 51.

As described above, the operator can set (select) the format of the transmitter 21 with the trigger device 50. When setting the format of the transmitter 21, the operator operates the operation portions 51 to select the format corresponding to the vehicle model of the vehicle 10 on which the transmitter 21 is mounted. The operator may directly select the format with the trigger device 50. Alternatively, the operator may select the vehicle model, and the trigger device controller 55 may select the format. For example, as shown in FIG. 3, the trigger device memory 55b stores the formats corresponding to each vehicle model. The operator operates the operation portions 51 to select the manufacturer, the model name, and then the model year. The trigger device controller 55 selects the format corresponding to the selected vehicle model. Further, for example, when selecting format A shown in FIG. 3, format A may be directly selected, or the selection of vehicle model A, B, or C may result in the selection of format A. The trigger device controller 55 generates data including a command that corresponds to the selected format.

The trigger device controller 55 outputs the generated data to the trigger device transmission circuit 52. The trigger device transmission circuit 52, which serves as a trigger device transmission unit, generates a trigger signal in accordance with the data. The trigger signal is transmitted from the trigger device transmission antenna 56.

The trigger device reception circuit 53, which serves as a reception unit, receives a signal returned from the transmitter 21 via the trigger device reception antenna 57. The trigger device reception circuit 53 demodulates the signal returned from the transmitter 21 and outputs the data to the trigger device controller 55.

Figure 4:
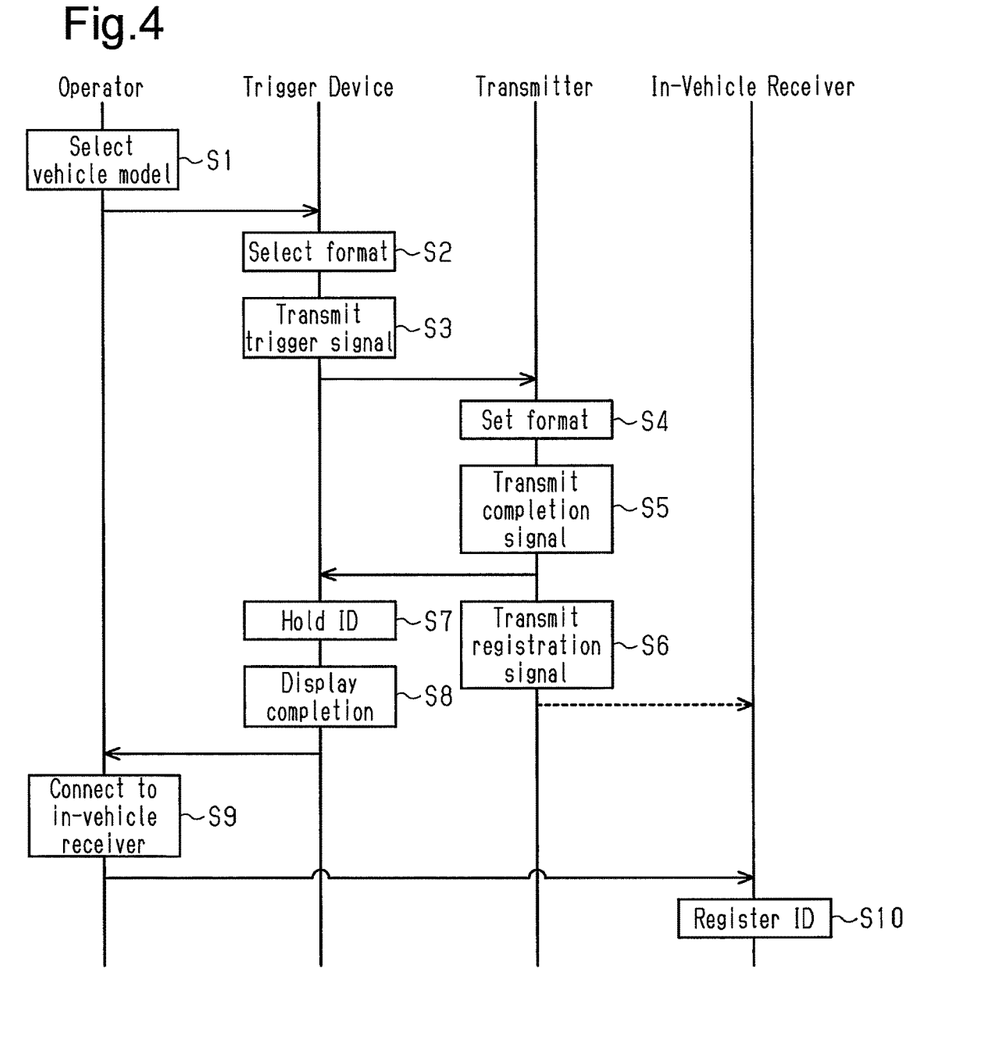
FIG. 4 is a schematic diagram illustrating interactions between an operator, the trigger device, the transmitter, and an in-vehicle receiver.

Processes executed by the trigger device controller 55, the receiver controller 41, and the transmitter controller 25 when setting the format of the transmitter 21 and registering the ID code to the in-vehicle receiver 40 will now be described. A connection process that is a process that registers the ID code by connecting the trigger device 50 and the in-vehicle receiver 40 will first be described. The format of the transmitter 21 is set after the transmitter 21 is mounted on the corresponding wheel assembly 11.

As shown in FIG. 4, the operator operates the operation portions 51 of the trigger device 50 to select the format of the transmitter 21. In the present embodiment, the operator operates the operation portions 51 to select the vehicle model (step S1).

The trigger device controller 55 selects the format that corresponds to the vehicle model input by the operator (step S2). The trigger device controller 55 transmits a trigger signal including a command, which corresponds to the format selected by the operator, from the trigger device transmission circuit 52 (step S3).

The transmitter controller 25 sets one format from the plurality of formats based on the command included in the trigger signal, which is received by the trigger reception unit 31 (step S4). The transmitter controller 25 controls the transmitter 21 to function in the selected format. In this manner, the format in which the transmitter 21 is to function is determined from the plurality of formats.

When the format of the transmitter 21 has been set, the transmitter controller 25 transmits a completion signal from the transmission circuit 26 (step S5). The completion signal is a signal that notifies the trigger device 50 that the format has been set. Further, the completion signal is transmitted in accordance with the protocol that corresponds to the trigger device 50. The completion signal includes the ID code.

After transmitting the completion signal, the transmitter controller 25 transmits a registration signal including the ID code (step S6). The registration signal is transmitted in accordance with the protocol that corresponds to the selected format, that is, the protocol that corresponds to the in-vehicle receiver 40. In this manner, the completion signal and the registration signal are transmitted from the transmitter 21 in response to the trigger signal that designates the format.

When the trigger device reception circuit 53 receives the completion signal, the trigger device controller 55 stores the ID code, which is included in the completion signal, in the trigger device memory 55b (step S7). The ID code is temporarily held in a rewritable memory such as a RAM or an EEPROM.

Further, when the trigger device reception circuit 53 receives the completion signal, the trigger device controller 55 shows on the display 54 that the format of the transmitter 21 has been set (step S8). This allows the operator to acknowledge that the transmitter 21 is functioning in the designated format.

The processes in steps S1 to S8 are executed on the transmitter 21 mounted on each wheel assembly 11. When the processes in steps S1 to S8 are completed, the number of ID codes held in the trigger device memory 55b will be the same as the number of transmitters 21 mounted on the wheel assemblies 11.

The operator connects the trigger device 50 to the in-vehicle receiver 40 (step S9). The trigger device 50 is wire-connected to an OBD2 connecter (terminal). The trigger device controller 55 transmits the ID code held in the trigger device memory 55b to the in-vehicle receiver 40. The in-vehicle receiver 40 records the ID code, which is transmitted from the trigger device 50, to the receiver memory 41b (step S10). Accordingly, the ID code is registered to the in-vehicle receiver 40.

In this manner, the trigger device 50 holds the ID code, which is included in the completion signal transmitted from the transmitter 21, and transmits the ID code to the in-vehicle receiver 40 to register the ID code to the in-vehicle receiver 40. Thus, in addition to notifying the operator that the format has been set, the completion signal is transmitted to register the ID code to the in-vehicle receiver 40.

A manual-relearn process performed to register an ID code to the in-vehicle receiver 40 with the registration signal transmitted from the transmitter 21 to the in-vehicle receiver 40 will now be described.

As shown by the broken line in FIG. 4, the manual-relearn process registers the ID code to the in-vehicle receiver 40 with the registration signal transmitted in step S6. In a state in which the in-vehicle receiver 40 is set in a registration mode that registers the ID codes, the manual-relearn process transmits the registration signal in order from the transmitter 21 of the right front wheel assembly 11, the transmitter 21 of the left front wheel assembly 11, and so on.

When the format is set by the trigger device 50 in a state in which the in-vehicle receiver 40 is in the registration mode, the transmitter 21 transmits the registration signal. The receiver controller 41 stores the ID code of the registration signal in the receiver memory 41b. Thus, by setting the format of the transmitter 21, the ID code is registered to the in-vehicle receiver 40. The registration signal is transmitted to register the ID code to the in-vehicle receiver 40.

As described above, the connection process uses the completion signal, and the manual-relearn process uses the registration signal to register the ID code. The transmitter 21 in the present embodiment transmits both the completion signal and the registration signal after the format is set. This registers the ID code to the in-vehicle receiver 40 regardless of whether the ID code registration process is the connection process or the manual-relearn process.

As described above, in the ID code registration process that registers the ID code to the in-vehicle receiver 40 with the trigger device 50, the trigger signal including the command designating the format selected by the operator is transmitted from the trigger device 50 to the transmitter 21. Subsequently, the ID code included in the signal transmitted from the transmitter 21 in response to the reception of the trigger signal is registered to the in-vehicle receiver 40.

Figure 5:
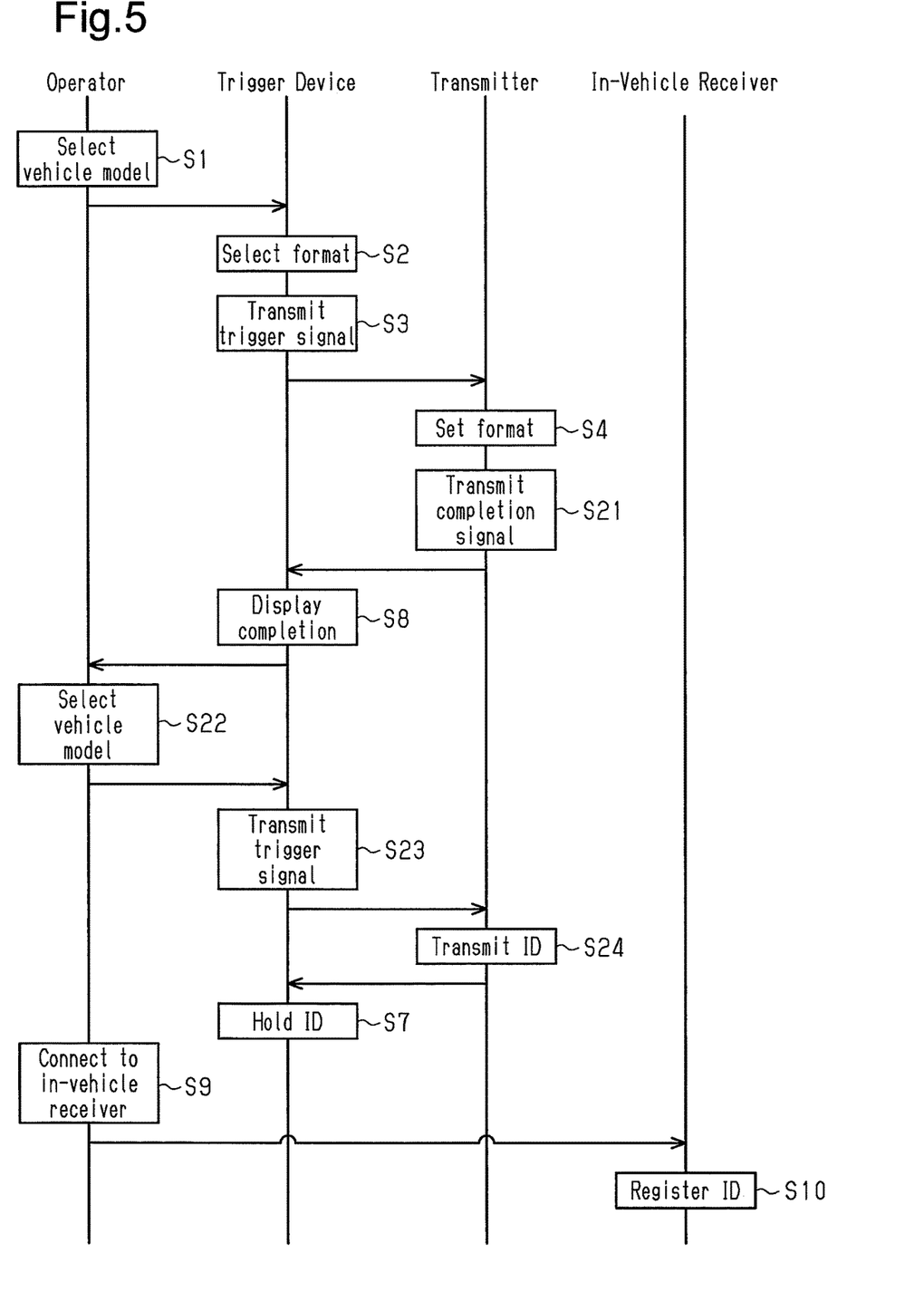
FIG. 5 is a schematic diagram illustrating interactions between the operator, the trigger device, the transmitter, and the in-vehicle receiver when performing ID code registration with a transmitter and a trigger device of a comparative example.

A trigger device of a comparative example and the processes executed when a transmitter of the comparative example registers the ID code to the in-vehicle receiver will now be described. Same reference numerals and characters are given to those processes that are the same as the corresponding processes of the embodiment. Such processes will not be described in detail.

As shown in FIG. 5, in step S1, the operator selects the vehicle model by operating the trigger device. Subsequently, in step S4, the format of the transmitter is set. The transmitter of the comparative example has not been mounted on the wheel assembly in the stage of designating the format with the trigger device.

In step S21, the transmitter transmits the completion signal to the trigger device. The completion signal does not include the ID code. In step S8, the trigger device shows on the display that the format has been set.

When the format of the transmitter has been set, the ID code is then registered to the in-vehicle receiver. The registration of the ID code to the in-vehicle receiver is performed after the transmitter has been mounted on the corresponding wheel assembly. After the transmitter is mounted on the wheel assembly, the operator uses the trigger device to transmit a trigger signal including a command that requests the transmitter to return the ID code. In order for the trigger device to transmit the trigger signal, in the same manner as step S1, the operator operates the trigger device to select the vehicle model (step S22). Accordingly, the trigger signal including the command that requests for the ID code to be returned is transmitted from the trigger device to the transmitter (step S23).

The transmitter transmits a signal including the ID code in response to the trigger signal (step S24). The ID code included in the trigger signal is registered to the in-vehicle receiver in the same manner as the embodiment.

As described above, with the trigger device of the comparative example and the transmitter of the comparative example, the operator needs to operate the trigger device separately for setting the format and for registering the ID code. More specifically, in comparison with the trigger device 50 and the transmitter 21 of the embodiment, the operation of step S22 is added. The operation requires ten to several tens of seconds whenever performed. Further, with the trigger device of the comparative example and the transmitter of the comparative example, the transmitter needs to be mounted on the wheel assembly between the task for setting the format of the transmitter and the task for registering the ID code to the in-vehicle receiver. Thus, the operator is unable to set the format of the transmitter and register the ID code to the in-vehicle receiver as a series of tasks performed with the trigger device.

In this respect, the transmitter 21 and the trigger device 50 of the above embodiment allow the format setting and registration of the ID code to the in-vehicle receiver 40 to be performed with a single operation (format input) of the trigger device 50. This shortens the operation time and reduces the burden on the operator.

Thus, the above embodiment has the advantages described below.

(1) When the trigger reception unit 31 receives the trigger signal including the command designating the format, the transmitter controller 25 sets the designated format and transmits the signal including the ID code. The signal is transmitted to the trigger device 50 to register the ID code to the in-vehicle receiver 40. That is, the format designation of the transmitter 21 performed with the trigger device 50 results in the transmission of the signal to the trigger device 50 for registering the ID code to the in-vehicle receiver 40. Accordingly, the trigger signal including the command designating the format is a trigger signal that includes two commands, namely, the command designating the format and the command for returning the ID code. Compared to when operating the trigger device 50 separately to designate the format and to transmit the signal for registering the ID code to the in-vehicle receiver 40, the burden on the operator is reduced. This facilitates the registration of the ID code to the in-vehicle receiver 40.

(2) In response to the trigger signal including the command designating the format, the transmitter 21 transmits both the completion signal, which corresponds to the protocol of the trigger device 50, and the registration signal, which corresponds to the protocol of the in-vehicle receiver 40. Thus, ID code registration is performed regardless of whether the ID code registration process is the connection process or the manual-relearn process.

(3) When the trigger device reception circuit 53 receives the completion signal transmitted by the transmitter 21 in response to the trigger signal, the trigger device controller 55 holds the ID code included in the completion signal. That is, the completion signal, which is transmitted in response to the trigger signal including the command designating the format, results in the trigger device controller 55 acknowledging the ID code of the transmitter 21. Thus, there is no need to transmit the trigger signal, which requests for the ID code to be returned to acknowledge the ID code of the transmitter 21, separately from the trigger signal, which designates the format. This reduces the burden on the operator and facilitates ID code registration.

(4) In the ID code registration system S, the format setting of the transmitter 21 results in the transmission of the signal for the ID code registration from the transmitter 21. Thus, compared to when separately performing an operation for designating the format and an operation for transmitting a signal to register the ID code to the in-vehicle receiver 40, the burden on the operator of the trigger device 50 is reduced. This facilitates the registration of the ID code to the in-vehicle receiver 40.

(5) With the ID code registration process using the trigger device 50, the ID code is registered by using the signal transmitted from the transmitter 21 in response to the trigger signal including the command designating the format. Thus, compared to when separately performing an operation for designating the format and an operation for transmitting a signal for registering the ID code to the in-vehicle receiver 40, the burden on the operator of the trigger device 50 is reduced. This facilitates the registration of the ID code to the in-vehicle receiver 40. The above embodiment may be modified as follows.

The transmitter 21 does not necessarily have to transmit the registration signal. In such a case, the ID code is registered to the in-vehicle receiver 40 with the connection process.

The transmitter 21 may transmit the completion signal without including the ID code. In such a case, the ID code is registered to the in-vehicle receiver 40 with the manual-relearn process.

In the above embodiment, the completion signal is transmitted including the ID code. Instead, a signal for having the trigger device controller 55 acknowledge the ID code of the transmitter 21 may be transmitted separately from the completion signal. More specifically, when the format has been set, the transmitter controller 25 transmits the completion signal that does not include the ID code from the transmission circuit 26 to the trigger device 50. Then, the transmitter controller 25 transmits an acknowledgement signal that corresponds to the protocol of the trigger device 50 to the trigger device 50. The acknowledgement signal is a signal that includes the ID code. The trigger device controller 55 stores the ID code included in the acknowledgement signal in the trigger device memory 55b. The trigger device 50 transmits the ID code stored in the trigger device memory 55b to the in-vehicle receiver 40 when connected to the in-vehicle receiver 40.

The format may correspond to a single vehicle model.

The vehicle may be a two-wheel vehicle or a vehicle that includes five or more wheel assemblies 11.

The frequency band of the trigger signal may be changed.

The transmitter 21 may be configured to function in one of the plurality of formats by writing format information (program) of the selected format to the memory 25b with the trigger device 50. That is, the transmitter 21 may be configured to function in one of the plurality of formats that are stored in the memory 25b. Alternatively, a program may be written to the memory 25b so that the transmitter 21 functions in the format selected with the trigger device 50.

DESCRIPTION OF REFERENCE CHARACTERS

S) ID code registration system; 10) vehicle; 11) wheel assembly; 13) tire; 21) transmitter; 22) pressure sensor; 25) transmitter controller (controller); 25b) memory; 26) transmission circuit (transmission unit); 31) trigger reception unit; 40) in-vehicle receiver; 50) trigger device; 53) trigger device reception circuit (reception unit); 55) trigger device controller

The invention claimed is:

1. A transmitter coupled to each of a plurality of wheel assemblies included in a vehicle and configured to function in one of a plurality of formats that are selectable by a command from a trigger device, the transmitter comprising:
a pressure sensor configured to detect a pressure of a tire and output a detection result of the pressure to a controller;
a memory that stores an ID code and various programs to control the transmitter;
a transmission unit configured to transmit a signal;
the controller configured to control the transmitter; and
a trigger reception unit configured to receive a trigger signal including the command from the trigger device,
wherein the controller is configured so that when the trigger reception unit receives a trigger signal including a command designating a format of the transmitter, the controller selects a program for having the transmitter function in the designated format and has the transmission unit transmit the signal including the ID code to register the ID code to an in-vehicle receiver.

2. The transmitter according to claim 1, wherein the controller is configured to transmit the signal including the ID code from the transmission unit in accordance with both a protocol that corresponds to the trigger device and a protocol that corresponds to the designated format.

3. A trigger device configured to transmit a trigger signal to a transmitter that is mounted on each of a plurality of wheel assemblies included in a vehicle and executes a process in accordance with a command included in the trigger signal, wherein the transmitter is configured to function in one of a plurality of formats that are selectable by a command included in the trigger signal, the trigger device comprising:
a reception unit configured to receive a signal transmitted from the transmitter;
a trigger device memory; and
a trigger device controller configured to control the trigger device, wherein
the trigger device controller is configured so that when the trigger device controller receives a signal transmitted from the transmitter with the reception unit in response to the trigger signal that includes a command designating the format, the trigger device controller stores an ID code included in the signal in the trigger device memory, and the trigger device controller is configured so that when the trigger device is connected to an in-vehicle receiver, the trigger device controller transmits the ID code stored in the trigger device memory to the in-vehicle receiver in order to register the ID code to the in-vehicle receiver.

4. An ID code registration system comprising:
a transmitter that is coupled to each of a plurality of wheel assemblies included in a vehicle and configured to function in one of a plurality of formats that are selectable by a command included in a trigger signal; and
a trigger device that transmits the trigger signal to the transmitter, wherein
the transmitter includes
a pressure sensor configured to detect a pressure of a tire and output a detection result of the pressure to a controller,
a memory that stores an ID code and various programs to control the transmitter,
a transmission unit configured to transmit a signal,
the controller configured to control the transmitter, and
a trigger reception unit configured to receive the trigger signal,
wherein the controller is configured so that when the controller receives the trigger signal including a command designating a format of the transmitter with the trigger reception unit, the controller selects a program for having the transmitter function in the designated format and has the transmission unit transmit a signal including the ID code to register the ID code to an in-vehicle receiver, and the trigger device includes
a reception unit configured to receive a signal transmitted from the transmitter,
a trigger device memory, and
a trigger device controller configured to control the trigger device, wherein
the trigger device controller is configured so that when the reception unit receives the signal including the ID code, the trigger device controller stores the ID code included in the signal in the trigger device memory, and
the trigger device controller is configured to so that when the trigger device is connected to the in-vehicle receiver, the trigger device controller transmits the ID code stored in the trigger device memory to the in-vehicle receiver in order to register the ID code to the in-vehicle receiver.

5. A method for registering an ID code of a transmitter that is coupled to each of a plurality of wheel assemblies included in a vehicle to an in-vehicle receiver with a trigger device, the method comprising:
transmitting a trigger signal including a command designating a format to the transmitter from the trigger device; and
registering the ID code to the in-vehicle receiver with a signal transmitted from the transmitter in response to reception of the trigger signal and including the ID code of the transmitter.

* * * * *